United States Patent [19]

Dewath

[11] 4,003,252
[45] Jan. 18, 1977

[54] ACOUSTICAL WAVE FLOWMETER

[75] Inventor: Edward James Dewath, San Francisco, Calif.

[73] Assignee: The Institutes of Medical Sciences, Calif.

[22] Filed: July 24, 1975

[21] Appl. No.: 599,245

Related U.S. Application Data

[63] Continuation-in-part of Ser. No. 497,971, Aug. 16, 1974, abandoned.

[52] U.S. Cl. ............................................. 73/194 A
[51] Int. Cl.$^2$ ......................................... G01F 1/66
[58] Field of Search .................. 73/194 A; 310/9.6

[56] References Cited

UNITED STATES PATENTS

| | | | |
|---|---|---|---|
| 1,881,543 | 10/1932 | Hartig et al. | 73/194 A |
| 2,515,221 | 7/1950 | Henning | 73/194 A |
| 2,746,291 | 5/1956 | Swengel | 73/194 A |
| 3,109,112 | 10/1963 | Lester | 73/194 A |
| 3,357,243 | 12/1967 | Woodcock | 73/194 A |
| 3,751,979 | 8/1973 | Ims | 73/194 A |

*Primary Examiner*—Charles A. Ruehl
*Attorney, Agent, or Firm*—Townsend and Townsend

[57] ABSTRACT

A fluid flowmeter for measuring the velocity of a fluid flowing along a path. The flowmeter comprises an enclosed housing having a fluid inlet and a fluid outlet; a liner having an inner wall surface positioned within the housing, the liner being fabricated from a material providing acoustical damping, e.g. polyurethane or rubber foam; and a plurality of acoustic wave transducers secured to the liner in notched portions of the liner inner wall surface. The transducers have inner wall surfaces dimensioned to provide with the inner wall surface of the liner a fluid flow conduit substantially devoid of protuberances and cavities, the transducers being mutually spaced along the fluid flow conduit by predetermined distances. Several embodiments are disclosed which employ both transducers having closed geometry, e.g. an annular or toroidal shape, and transducers having open geometry, e.g. toroidal segmental shape; and which employ different modes of operation, e.g. single or dual frequency wave generation and switched or continuous transducer operation.

20 Claims, 6 Drawing Figures

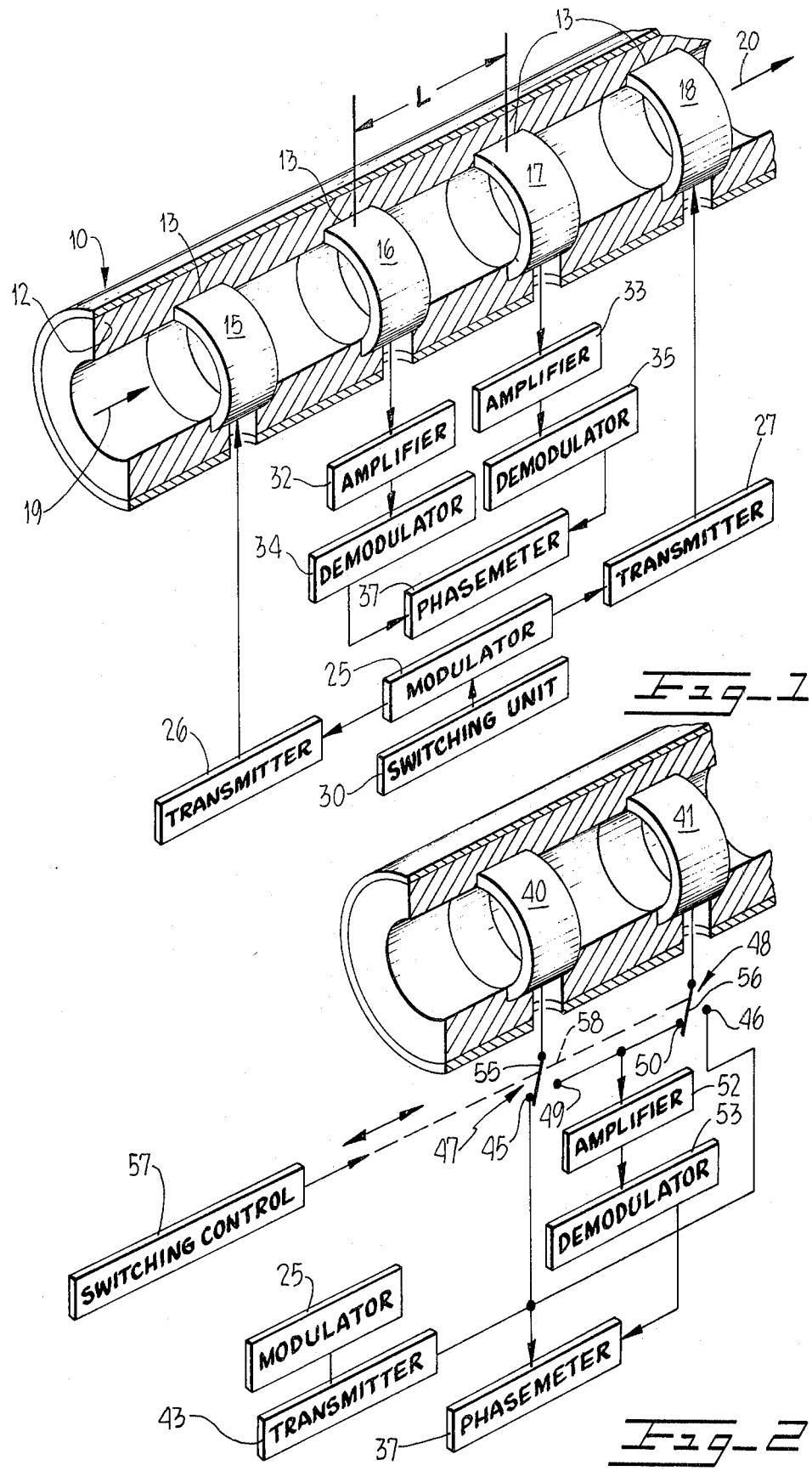

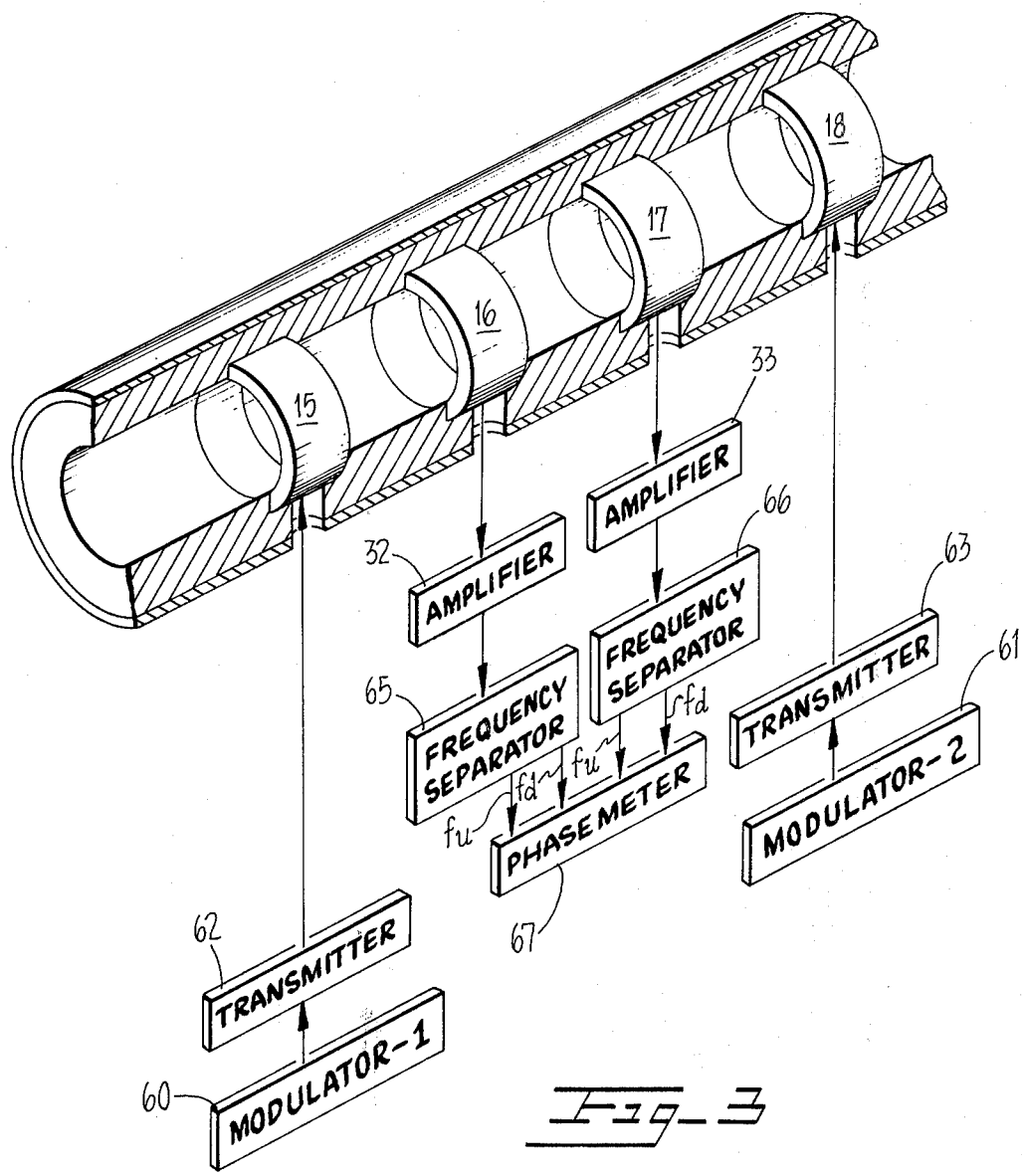

ACOUSTICAL WAVE FLOWMETER

CROSS-REFERENCE

This application is a continuation-in-part of U.S. Ser. No. 497,971 filed Aug. 16, 1974 for ACOUSTICAL WAVE FLOWMETER, now abandoned.

BACKGROUND OF THE INVENTION

This invention relates to acoustical wave flowmeters for measuring the rate of flow of the fluid along a confined path.

Acoustical wave flow meters are know which are employed to measure the velocity of a fluid moving in a confined volume. In a typical apparatus of this type, e.g. that disclosed in U.S. Pat. No. 3,109,112 issued Oct. 29, 1963, a pair of transducers capable of generating and receiving compressional waves in the audible or ultrasonic frequency range are placed inside an enclosure confining the fluid and defining a flow path therefore, with the transducers inserted directly in the flow path of the fluid. The transducers are alternately energized in a transmit and receive mode so that compressional waves are generated in the flowing fluid by a first transducer and received by the other transducer, the compressional waves traveling alternately upstream and downstream. By measuring the phase difference between the transmitted and received waves in both directions, the velocity of the fluid along the flow path may be determined.

In a modification of this technique, as expressly disclosed in the above referenced U.S. Patent, each transducer may comprise a compound annular ring transducer having both a transmit and a receive section specifically configured to minimize the adverse affects of thermal gradients in the flowing fluid. In another modification of the above known technique, four transducers are employed: two receive transducers spaced by the fixed distance L, and two transmit transducers positioned on the downstream and upstream side of the receiving pair. Other arrangements employing multiple transducers are also known.

All of the foregoing known flow meter configurations require that the transducers be physically located in either the flow path of the fluid whose velocity is to be measured or in cavities introduced into the walls of the fluid conduit. With either arrangement the normal flow of the fluid is substantially altered in passing the transducer sites. Because of this introduced turbulence, the accuracy of the measurements obtained with such systems suffers accordingly. In addition, contaminant materials present in the fluid, such as sedimentary particles or the like, become attached to the transducer surfaces, thereby impairing the transmitting and receiving characteristics thereof. In addition, in some ranges of pressures and fluid velocities, the force exerted by the flowing fluid on the transducer surfaces adversely alters the transmission and reception characteristics thereof, thereby further adding inaccuracies to the fluid velocity measurements obtained. Efforts to overcome these and other disadvantages of known flowmeter systems of the above type have not met with wide success.

SUMMARY OF THE INVENTION

The invention comprises an acoustical wave flowmeter in which the transmitting and receiving transducers are mounted in the fluid flow conduit in such a manner as to provide a smooth walled flow conduit having no substantial protuberances into the fluid flow path or cavities. In a first embodiment of the invention, a housing having substantially rigid walls is provided with an inner liner of acoustic damping material in which four transducers are mounted, the inner surfaces of the transducers having substantially the same shape and dimensions as the inner wall surface of the liner of acoustic damping material. Two inner transducers are spaced a fixed distance and are operated exclusively in a receive mode; while the two outer transducers are operated exclusively in a transmit mode.

In operation, the outer transmit transducers are alternately energized to generate compressional waves which travel from the transmitting transducer to the receiving pair in the upstream and downstream directions, respectively. By measuring the phase difference between waves traveling in the upstream and the downstream directions and received by the receiving transducer pair, the velocity of fluid flow in the conduit is readily determined.

In another embodiment of the invention, a pair of transducers are mounted in the acoustic damping material, with the inner wall surfaces of the transducers having substantially the same shape and dimensions as the inner wall surface of the acoustic damping liner, and the transducers are alternately operated in the transmit and receive modes. Measurement of fluid velocity is accomplished in a similar manner to that discussed above with respect to the first embodiment by measuring the phase difference between the transmitted and received waves in the upstream and downstream directions.

In another embodiment of the invention, a pair of outer transmit transducers are continuously energized to generate upstream and downstream compressional waves of different frequencies $f_u, f_d$. Two inner transducers spaced a fixed distance continuously detect the upstream and downstream travelling waves. Measurement of fluid velocity is accomplished by measuring the phase difference between the upstream travelling waves of frequency $f_u$ detected by the receiving transducer pair and the phase difference between the downstream travelling frequency $f_d$ detected by the receiving transducer pair.

The transducers alternately have a closed geometrical configuration, e.g. annular or toroidal, or an open geometrical configuration, e.g. annular segmental or toroidal segmental.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram partially in section illustrating a first embodiment of the invention;

FIG. 2 is a schematic diagram partially in section of an alternate embodiment of the invention;

FIG. 3 is a schematic diagram partially in section illustrating another embodiment of the invention;

DESCRIPTION OF THE PREFERRED EMBODIMENTS

Figure 4:
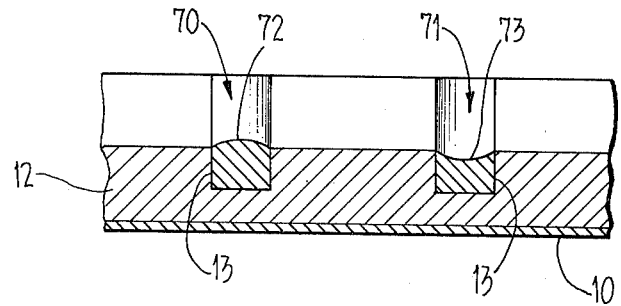
FIG. 4 is a sectional view taken along lines 4—4 of FIG. 2 illustrating still another embodiment of the invention.

Turning now to the drawings, FIG. 1 shows a first embodiment of the invention. A substantially cylindrical casing 10 envelops a liner 12 having a plurality of annular notches 13 formed in the inner wall thereof. Liner 12 is preferably fabricated from polyurethane foam, foam rubber or other material having good acoustical damping properties. Liner 12 may be secured to the inner wall of casing 10 by any suitable means, such as an adhesive, bonding or the like.

Received within annular notches 13 of liner 12 are a plurality of annular transducers 15 – 18 having an inner diameter and center of curvature equal to that of the inner wall surface of liner 12 to define the outer boundary of a fluid flow path having substantially continuous walls so that fluid flowing along the direction of arrows 19, 20 encounters neither protuberances nor cavities in the region of the flowmeter.

Transducers 15–18 may comprise any one of a number of conventional devices capable of operating in the radial or hoop mode to generate compressional waves which travel along the axis of casing 10. Examples of such devices are piezoelectric transducers, such as those manufactured from polyvinylflouridene or other high polymer organic piezoelectric materials; ceramic transducers, e.g. transducers fabricated from barium titanate, lead zirconate titanate, or other polarized polycrystalene ferro electric ceramic materials; quartz; tourmaline; or equivalent electromechanical devices known to those skilled in the art.

Inner transducers 16, 17 are spaced by a predetermined distance L and are operated in the receive mode only. Outer transducers 15, 18, on the other hand, are operated in the transmit mode only.

A conventional modulator 25 capable of generating a signal train having the desired predetermined frequency $f$ is coupled to a pair of transmitters 26, 27, the outputs of which are coupled respectively to transmit transducers 15, 18. A switching unit 30 is coupled to the control input of modulator 25 to control the application of the output of modulator 25 to transmitters 26, 27 in an alternate fashion so that only one transducer 15, 18 is energized during a given time period. The electrical output terminals of receive transducers 16, 17 are coupled respectively via a pair of amplifiers 32, 33 to a pair of conventional demodulators 34, 35. The respective output terminals of demodulators 34, 35 are coupled to the signal input terminals of a conventional phasemeter 37. Since elements 25 – 27, 30, 32 – 35 and 37 are all well known in the art, further details thereof are omitted to avoid prolixity.

In operation, with fluid flowing within the flow path defined by the interior of liner 12 and the internal wall surfaces of transducers 15 – 18, modulator 25 is enabled by switching unit 30 to energize transmitter 26, thereby energizing the upstream transmitting transducer 15. The resulting compressional wave train travels downstream and is received first by receiving transducer 16 and subsequently by receiving transducer 17. The received waves are converted by receive transducers 16, 17 to electrical signals having the same frequency, are demodulated by demodulators 34, 35 and the phase difference therebetween is recorded or displayed by phasemeter 37. Thereafter, switching unit 30 directs modulator 25 to energize transmitter 27 which causes downstream transmitting transducer 18 to generate a compressional wave train which is first received by receive transducer 17 and subsequently by receive transducer 16. The received acoustic compressional wave trains are converted by the receive transducers 16, 17 to electrical signals, are demodulated by demodulators 34, 35, and the phase difference therebetween is displayed or recorded by phasemeter 37. Thereafter, transmit transducers 15, 18 are alternately energized in a mutually exclusive mode, the received compressional wave trains are converted to electrical signal trains and the phase difference therebetween is detected by phasemeter 37. By utilizing the differential phase values thus obtained in the formula noted below, the velocity of the fluid travelling along the flow path may be readily determined. If desired, phasemeter 37 may be provided with a simple conventional analogue or digital device for automatically computing the flow velocity.

FIG. 2 shows an alternate embodiment of the invention employing a single pair of transducers 40, 41 which are each operated in both the transmit and receive modes. In this embodiment, transmitters 26, 27 are replaced by a single transmitter 43 driven by modulator 25. The output of transmitter 43 is coupled to one input of phasemeter 37 and also to contact terminals 45, 46 of a pair of single pole double throw switches 47, 48. The remaining stationary contact terminals 49, 50 of switches 47, 48 are coupled to the input of a single amplifier 52. The output of amplifier 52 is coupled to the input of a conventional demodulator 53, the output of which is coupled to the remaining input of phasemeter 37. The moveable blade contacts 55, 56 of switches 47, 48 are coupled to transducers 40, 41. A switching control unit 57 is mechanically coupled as indicated by broken line 58 to moveable blades 55, 56 and functions to cyclically place these elements in their alternate positions.

In operation, with modulator 25 energized the resulting output signal from transmitter 43 is coupled to a first input of phasemeter 37 and also to transducer 40 via terminal 45 and blade 55. The resulting electrical signal generated by transducer 41 in response to the received compressional waves is coupled via blade 56 and contact terminal 50 to the input of amplifier 52. The amplified signal is demodulated in the demodulator 53 and coupled to the remaining input of phasemeter 37. When switching control unit 57 transfers blades 55, 56 to their alternate configuration (not illustrated), the output of transmitter 43 is coupled via contact terminal 46 and moveable blade 56 of switch 48 to transducer 41. The resulting electrical signal generated by transducer 40 in response to the received compressional waves is coupled via blade 55 and terminal 49 of switch 47 to the input of amplifier 52. The output of amplifier 52 is demodulated by demodulator 53 and coupled to the remaining input of phasemeter 37. Thus, in the FIG. 2 embodiment, transducers 40, 41 are alternately operated as transmitting and receiving transducers and the phase difference between the transmitted and received signals is detected by phasemeter 37.

In both the FIG. 1 and FIG. 2 embodiments, the fluid velocity may be determined by the equation:

$$V = L \pi f \left[ \frac{(\Delta\phi_\mu - \Delta\phi_d)}{(\Delta\phi_\mu + 2n\pi)(\Delta\phi_d + 2n\pi)} \right]$$

Where V is the fluid velocity; L is the separation distance between receiving transducers 16, 17 (FIG. 1) or transducers 40, 41 (FIG. 2); $f$ is the frequency of the compressional waves; $n$ is an integer; $\Delta\phi_u$ is the phase difference in the upstream direction; and $\Delta\phi_d$ is the phase difference in the downstream direction.

FIG. 3 illustrates a dual frequency embodiment of the invention which provides a broader band width, or faster response time, than the FIG. 1 and FIG. 2 embodiments. In the FIG. 3 embodiment, a pair of modulators 60, 61 are provided for continuously operating a pair of transmitters 62, 63 at different frequencies $f_u, f_d$ respectively. The outputs of amplifiers 32, 33 are respectively coupled to the inputs of conventional frequency separators 65, 66 which separate the signal input thereto into two signals of frequency $f_u$ and $f_d$. The individual constant frequency output signals from frequency separators 65, 66 are coupled to the signal inputs of phasemeter 67.

In operation, transmitting transducers 15, 18 continuously generate upstream and downstream compressional waves at frequencies $f_u$, $f_d$, respectively. The electrical output signals from receiving transducers 16, 17 generated in response to the compressional waves received thereby are amplified respectively in amplifiers 32, 33 and coupled to frequency separators 65, 66. The single frequency output signals $f_u$ from frequency separators 65, 66 are coupled to phasemeter 67 which determines the phase difference between the compressional waves of frequency $f_u$ received by transducers 16, 17. Similarly, the single frequency output signals $f_d$ from frequency separators 65, 66 are coupled to phasemeter 67 in which the phase difference between the downstream compressional waves of frequency $f_d$ received by transducers 16, 17 is determined. The velocity of fluid travelling along the flow path may be readily determined by utilizing the differential phase values thus obtained in the following formula:

$$V = L \pi \left[ \frac{\left(\frac{\Delta\phi_\mu + n_\mu 2\pi}{f_\mu}\right) - \left(\frac{\Delta\phi_d + n_d 2\pi}{f_d}\right)}{\left(\frac{\Delta\phi_\mu + n_\mu 2\pi}{f_\mu}\right)\left(\frac{\Delta\phi_d + n_d 2\pi}{f_d}\right)} \right]$$

Where V is the fluid velocity; L is the separation distance between transducers 16, 17; $f_u$ is the frequency of the compressional waves travelling in the upstream direction; $f_d$ is the frequency of the compressional waves travelling in the downstream direction; $n_u$ is the maximum integral number of complete cycles of waves of frequency $f_u$ which can be accommodated in a path of length L; $n_d$ is the maximum integral number of cycles of waves of frequency $f_d$ which can be accommodated in a path length L; $\Delta\phi_u$ is the phase difference in the upstream direction; and $\Delta\phi_d$ is the phase difference in the downstream direction.

While transducers 15–18 of FIGS. 1 and 3 and transducers 40 and 41 of FIG. 2 have been described above as having an inner diameter and center of curvature equal to that of the inner wall surface of liner 12, in practice some deviation from this ideal is permissible without impairing the operating efficiency of the invention. For example, as depicted in FIG. 4 transducers 40, 41 may have an inner surface 71 with a slight positive curvature or an inner surface 72 with a slight negative curvature without seriously affecting the operation of the system in an adverse manner. Similarly, the inner diameter and radius of curvature of the transducers need not exactly match the inner diameter and center of curvature of the inner wall surface of liner 12, but may deviate slightly from this ideal value. The magnitude of the maximum permissible deviation is dependent upon the parameters of a given application and can best be determined in an empirical manner. In general, however, any deviation from the ideal should be so slight that any turbulence introduced into fluid flowing across the transducer surfaces is negligible and so that contaminant materials present in the fluid do not collect along the transducer surfaces.

Figure 5:
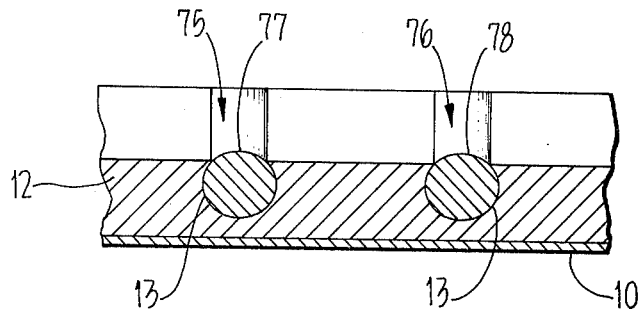
FIG. 5 is a sectional view similar to FIG. 4 illustrating still another embodiment of the invention.

FIG. 5 illustrates another embodiment of the invention employing a pair of transducers 75, 76, each of which comprises a toroid having a generally elliptical cross-sectional configuration with an inner surface 77, 78 protruding slightly inwardly of the inner surface of liner 12.

Figure 6:
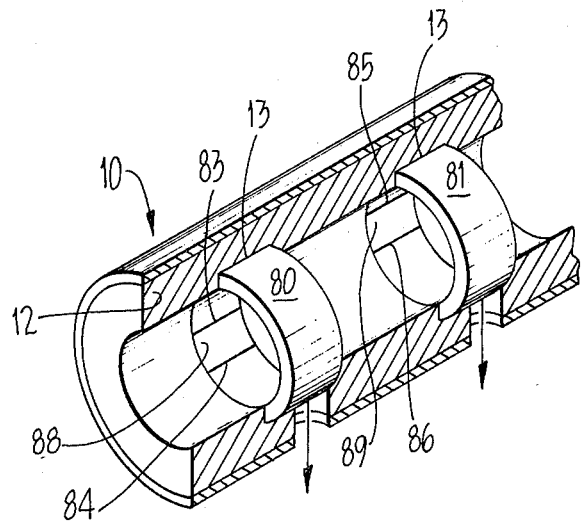
FIG. 6 is a partial sectional view illustrating still another embodiment of the invention.

While the transducers described above have a closed geometrical configuration, i.e. a complete annular shape (transducers 15–18, 40 and 41) and toroidal shape (transducers 70, 71, 75 and 76), transducers having an open geometry such as that illustrated in FIG. 6 may be employed in some applications. As seen in this FIG., a pair of annular segmental transducers 80, 81 are mounted in annular notches 13 of liner 12. Transducer 80 has a gap defined by edges 83, 84 while transducer 81 has a gap defined by edges 85, 86. These gaps are closed by inserts 88, 89 having an inner wall surface contour closely matched to that of liner 12 and dimensioned to be snugly received in the transducer 80, 81 gaps. Inserts 88, 89 may be fabricated from the same material as liner 12 or other material having substantially equivalent acoustical damping properties.

In general, use of transducers having the closed geometry illustrated in FIGS. 1–5 is preferred in most applications since operation of such transducers in the radial mode results in compressional waves which travel axially along the flow path without reflection from the inner surface of liner 12 due to the geometrical symmetry. In contrast, transducers having a toroidal segmental geometry typically produce compressional waves when operated in the radial mode which travel in different paths from the transmitting transducer to the receiving transducer so that some waves travel directly between transducers while others undergo one or more reflections at the boundaries of the flow path. Although waves striking the boundary of the flow path are attenuated due to the acoustical damping properties of liner 12, it is typically desirable to provide additional electronic gating circuitry for screening out reflected waves arriving at the receiving transducer. While such circuitry is conventional, inclusion thereof in a system increases the total fabrication cost and also adds a degree of complexity which may be undesirable in some applications.

As will now be apparent, velocity flow meters constructed in accordance with the teachings of the invention permit the accurate measurement of fluid velocity by substantially eliminating protuberances or cavities along the flow path and the disadvantages attendant thereon noted above. In addition, velocity meters may be constructed according to the invention in a very simple and economical fashion and, once constructed, have been found to be extremely reliable in operation and rugged in construction. Moreover, such velocity flow meters are not limited to operation at a resonant system frequency as are many prior art devices and are thus substantially independent of variations in temperature and impedance loading.

While the above provides a full and complete disclosure of the preferred embodiments of the invention, various modifications, alternate constructions and equivalents may be employed without departing from the true spirit and scope of the invention. For example, while the invention has been described in connection with elements having right circular cylindrical geometry other geometrical shapes, e.g. elliptical, aspherical and the like may be employed if desired in a given application. Therefore, the above description and illustrations should not be construed as limiting the scope of the invention, which is defined by the appended claims.

What is claimed is:

1. A fluid flowmeter for measuring the velocity of a moving fluid, said flowmeter comprising:

an enclosed housing having an outer surface, an inner surface, a fluid inlet and a fluid outlet;

a generally cylindrical liner received within said housing and having an inner wall surface provided with first and second recesses spaced along the longitudinal axis of said liner by a predetermined distance and extending in a direction substantially normal to said axis, said liner being fabricated from a material providing acoustical damping and extending between said fluid inlet and said fluid outlet; and first and second acousto-electric transducers operable in a radial vibration mode and carried by said liner, said transducers each having an outer wall surface received within a different one of said first and second recesses at a position interior to said inner surface of said housing, and an inner wall surface, said transducers each being dimensioned to provide with said inner wall surface of said liner a fluid flow conduit substantially devoid of protuberances and cavities and extending between said fluid inlet and said fluid outlet of said housing; said transducers being capable of generating and sensing compressional waves traveling in said fluid along said flow conduit when operated in said radial vibration mode and being acoustically isolated from said housing by said liner.

2. The combination of claim 1 wherein said liner material comprises polyurethane foam.

3. The combination of claim 1 wherein said liner material comprises foam rubber.

4. The combination of claim 1 wherein said transducers have a toroidal shape.

5. The combination of claim 1 wherein at least one of said transducers has a toroidal segmental shape with opposing faces having a gap therebetween, and further including an insert received in said gap for providing a substantially continuous smooth wall surface.

6. The combination of claim 1 wherein said transducers have an annular shape.

7. The combination of claim 1 wherein at least one of said transducers has an annular segmental shape with opposing faces having a gap therebetween, and further including an insert received in said gap for providing a substantially continuous smooth wall surface.

8. The combination of claim 1 wherein said liner is provided with third and fourth recesses flanking said first and second recesses and spaced a predetermined distance along said fluid flow conduit from said first and second recesses in the downstream and upstream directions, respectively, said third and fourth recesses each extending in a direction substantially normal to said axis of said liner; and third and fourth acousto-electric transducers operable in a radial vibration mode and carried by said liner, said third and fourth transducers each having an outer wall surface received within a different one of said third and fourth recesses at a position interior to said inner surface of said housing and an inner wall surface, said third and fourth transducers each being dimensioned to provide with adjacent portions of said inner wall surface of said liner and said inner wall surfaces of said first and second transducers said fluid flow conduit;

said third and fourth transducers being capable of generating and sensing compressional waves traveling in said fluid along said flow conduit when operated in said radial vibration mode and being acoustically isolated from said housing by said liner.

9. The combination of claim 8 wherein said transducers have a toroidal shape.

10. The combination of claim 8 wherein at least one of said transducers has a toroidal segmental shape with opposing faces having a gap therebetween, and further including an insert received in said gap for providing a substantially continuous smooth wall surface.

11. The combination of claim 8 wherein said transducers have an annular shape.

12. The combination of claim 8 wherein at least one of said transducers has an annular segmental shape with opposing faces having a gap therebetween, and further including an insert received in said gap for providing a substantially continuous smooth wall surface.

13. In a fluid flowmeter having a housing with an outer surface, an inner surface, a fluid inlet and a fluid outlet, and a plurality of transducers for detecting a parameter related to the velocity of a fluid flowing through said housing, the improvement comprising a generally cylindrical liner received within said housing and having an inner wall surface provided with first and second recesses spaced along the longitudinal axis of said liner by a predetermined distance and extending in a direction substantially normal to said axis, said liner being fabricated from a material providing acoustical damping and extending between said fluid inlet and said fluid outlet; and first and second acousto-electric transducers operable in a radial vibration mode and carried by said liner, said transducers each having an outer wall surface received within a different one of said first and second recesses at a position interior to said inner surface of said housing, and an inner wall surface, said transducers each being dimensioned to provide with said inner wall surface of said liner a fluid flow conduit substantially devoid of protuberances and cavities and extending between said fluid inlet and said fluid outlet of said housing; said transducers being capable of generating and sensing compressional waves traveling in said fluid along said flow conduit when operated in said radial vibration mode and being acoustically isolated from said housing by said liner.

14. The combination of claim 13 wherein said liner material comprises polyurethane foam.

15. The combination of claim 13 wherein said liner material comprises foam rubber.

16. The combination of claim 13 wherein said transducers have a toroidal shape.

17. The combination of claim 13 wherein at least one of said transducers has a toroidal segmental shape with opposing faces having a gap therebetween, and further including an insert received in said gap for providing a substantially continuous smooth wall surface.

18. The combination of claim 13 wherein said transducers have an annular shape.

19. The combination of claim 13 wherein at least one of said transducers has an annular segmental shape with opposing faces having a gap therebetween, and further including an insert received in said gap for providing a substantially continuous smooth wall surface.

20. The combination of claim 13 wherein said liner is provided with third and fourth recesses flanking said first and second recesses and spaced a predetermined distance along said fluid flow conduit from said first and second recesses in the downstream and upstream directions, respectively, said third and fourth recesses each extending in a direction substantially normal to said axis of said liner; and third and fourth acousto-electric transducers operable in a radial vibration mode and carried by said liner, said third and fourth transducers each having an outer wall surface received within a different one of said third and fourth recesses at a position interior to said inner surface of said housing, and an inner wall surface, said third and fourth transducers each being dimensioned to provide with adjacent portions of said inner wall surface of said liner and said inner wall surfaces of said first and second transducers said fluid flow conduit;

said third and fourth transducers being capable of generating and sensing compressional waves traveling in said fluid along said flow conduit when operated in said radial vibration mode and being acoustically isolated from said housing by said liner.

* * * * *